US011156243B2

(12) United States Patent
Thomas

(10) Patent No.: US 11,156,243 B2
(45) Date of Patent: Oct. 26, 2021

(54) BOLTED JOINT OF AN OFFSHORE STRUCTURE

(71) Applicant: INNOGY SE, Essen (DE)

(72) Inventor: Christopher Mark Thomas, Caerphilly (GB)

(73) Assignee: INNOGY SE, Essen (DE)

(*) Notice: Subject to any disclaimer, the term of this patent is extended or adjusted under 35 U.S.C. 154(b) by 622 days.

(21) Appl. No.: 15/758,715

(22) PCT Filed: Sep. 5, 2016

(86) PCT No.: PCT/EP2016/070817
§ 371 (c)(1),
(2) Date: Mar. 8, 2018

(87) PCT Pub. No.: WO2017/045947
PCT Pub. Date: Mar. 23, 2017

(65) Prior Publication Data
US 2018/0291937 A1    Oct. 11, 2018

(30) Foreign Application Priority Data
Sep. 14, 2015  (EP) ..................................... 15185038

(51) Int. Cl.
*F16B 5/02*       (2006.01)
*E04H 12/08*     (2006.01)
(Continued)

(52) U.S. Cl.
CPC ................ *F16B 5/02* (2013.01); *E02B 17/00* (2013.01); *E04H 12/085* (2013.01); *F03D 13/20* (2016.05);
(Continued)

(58) Field of Classification Search
CPC ........... Y10T 403/645; F16B 2200/506; F16B 7/182; E04H 12/085; F16J 15/00;
(Continued)

(56) References Cited

U.S. PATENT DOCUMENTS 2,250,448 A * 7/1941 Edwards .................... F16D 3/50
403/337
2,653,834 A * 9/1953 Purkhiser .............. F16L 25/026
285/50

(Continued)

FOREIGN PATENT DOCUMENTS

DE    202013010214 U1 * 11/2014 ........... E04H 12/085
DE    202013010214 U1    11/2014
(Continued)

OTHER PUBLICATIONS

International Search Report and Written Opinion dated Nov. 18, 2016 in International Patent Application No. PCT/EP2016/070817.
(Continued)

*Primary Examiner* — Amber R Anderson
*Assistant Examiner* — Alexus Camero
(74) *Attorney, Agent, or Firm* — Wiley Rein LLP

(57) ABSTRACT

A bolted joint of an offshore structure comprises first and second connecting elements, wherein the first connecting element forms part of an offshore tower or an offshore platform and the second connecting element forms part of a foundation structure. The first connecting element comprises a first flange and the second connecting element comprises a second flange, wherein the first and second flanges abut each other with through holes in alignment. One of the first and second connecting elements comprises an outer peripheral skirt covering a butt joint between the first and second flanges and defining an outer annular space surrounding the butt joint, One of the first and second connecting elements (Continued)

comprises a peripheral collar, the skirt and the collar confining the annular space, the sealing element being a compressible sealing element sandwiched between the skirt and the collar.

11 Claims, 1 Drawing Sheet

(51) Int. Cl.
  *F03D 13/25* (2016.01)
  *E02B 17/00* (2006.01)
  *F16J 15/02* (2006.01)
  *F03D 13/20* (2016.01)

(52) U.S. Cl.
  CPC ............ *F03D 13/25* (2016.05); *F16J 15/022* (2013.01); *E02B 2017/0091* (2013.01); *F05B 2220/706* (2013.01); *F05B 2240/95* (2013.01); *F05B 2260/301* (2013.01); *Y02E 10/72* (2013.01); *Y02E 10/727* (2013.01)

(58) Field of Classification Search
  CPC ......... F16J 15/002; F16J 15/02; F16J 15/021; F16J 15/025; F16J 15/06; F16J 15/10; E21B 33/00; E21B 33/02; E21B 2200/01
  USPC ........................................................ 403/337
  See application file for complete search history.

(56) References Cited

U.S. PATENT DOCUMENTS

| | | | | |
|---|---|---|---|---|
| 3,768,016 | A * | 10/1973 | Townsend | E04H 12/08 455/25 |
| 3,913,928 | A * | 10/1975 | Yamaguchi | F16J 15/025 277/604 |
| 5,333,436 | A * | 8/1994 | Noble | E04H 12/085 52/849 |
| 5,890,701 | A * | 4/1999 | Cavanagh | B66D 1/7463 242/319 |
| 8,322,757 | B2 * | 12/2012 | Ma | E04H 12/085 285/416 |
| 9,651,019 | B2 * | 5/2017 | Moeller | G01B 5/25 |
| 10,125,903 | B1 * | 11/2018 | Doran | F16L 19/0212 |
| 10,443,728 | B1 * | 10/2019 | Oman | F16J 15/025 |
| 10,704,535 | B2 * | 7/2020 | Christensen | F03D 13/20 |
| 2011/0315404 | A1 * | 12/2011 | Bailey | E21B 33/06 166/387 |
| 2014/0237932 | A1 * | 8/2014 | Moestrup | E04H 12/085 52/651.01 |

FOREIGN PATENT DOCUMENTS

| | | | | |
|---|---|---|---|---|
| EP | | 2884026 A2 * | 6/2015 | ........... E04H 12/085 |
| EP | | 2884026 A2 | 6/2015 | |
| FR | | 2749342 A1 * | 12/1997 | ........... E04H 12/085 |

OTHER PUBLICATIONS

International Preliminary Report On Patentability dated Mar. 29, 2018 in International Application No. PCT/EP2016/070817, filed Sep. 5, 2016.

* cited by examiner

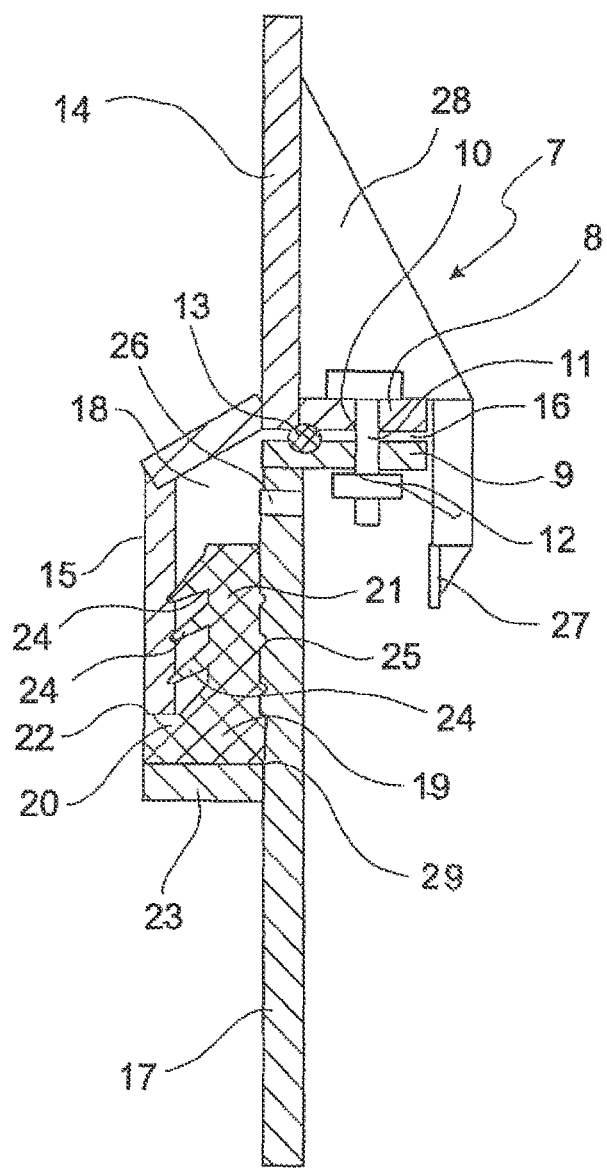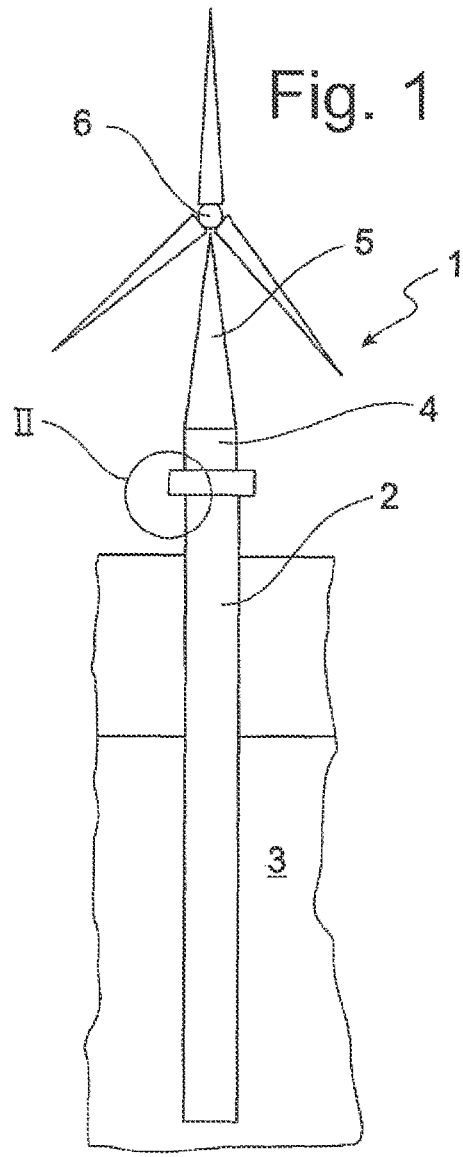

BOLTED JOINT OF AN OFFSHORE STRUCTURE

RELATED APPLICATIONS

This Application is a § 371 National Stage Application of PCT/EP2016/070817, filed Sep. 5, 2016, which claims priority benefit of European Patent Application No. 15185038.5, filed Sep. 14, 2015, which applications are incorporated entirely by reference herein for all purposes.

FIELD

The invention refers to a bolted joint of an offshore structure comprising first and second connecting elements, the first connecting element forming part of an offshore tower or an offshore platform and the second connecting element forming part of a foundation structure, the first connecting element comprising a first flange and the second connecting element comprising a second flange, the first and second flanges comprising through holes, the first and second flanges abutting each other with the through holes in alignment and being secured to each other by means of fastening elements extending into the through holes, one of the first and second connecting elements comprising an outer peripheral skirt covering a butt joint between the first and second flanges and defining an outer annular space surrounding the butt joint, the annular space being sealed against the ingress of water by a sealing element.

SUMMARY AND DESCRIPTION OF RELATED ART

A bolted joint of the above-referred kind is for example disclosed in the European patent application EP 2 832 938 A2.

Previously, many monopile foundations of offshore structures have been connected to their upper structures via a grouted connection. More recently, following structure problems with grouted connections, consideration is being given to using alternative connection types including bolted flanges as for example disclosed in EP 2 832 938 A2. However, bolted flanges are susceptible to corrosion and therefore need to be adequately protected against water ingress. Long grouted skirts are a possible solution but are expensive due to high fabrication costs and lengthy installation time.

According to the solution proposed in European patent application EP 2 832 938 A2 there is provided a long skirt or a long sleeve on either a monopile or a transition piece of a foundation structure covering the butt joint between the abutting flanges of the monopile and the transition piece, the sleeve defining an annular space on the periphery of the joint. One concept disclosed in EP 2 832 938 A2 is that the sleeve is attached to the transition piece and extends downwardly. The space confined by the sleeve is sealed such the space may be drained in the direction of gravity but the ingress of water from below is prevented. This is achieved by sealing lips of the skirt which are inclined downwardly.

Particularly, this concept has the drawback that establishing the joint in terms of precise alignment of the parts is fairly difficult.

SUMMARY OF THE INVENTION

Exact alignment of the connecting elements from the very beginning is crucial not only in order to allow proper bolting of the connection but also in order to ensure the sealing integrity of the joint. It is therefore an object of the current invention to provide a bolted joint of an offshore structure of the above-referred kind which is of relatively lower cost and quicker and easier to install with lower weather downtime risk.

It is also an object of the current invention to provide a bolted joint of the above-referred kind where the connecting elements to be connected with each other are easier and quicker to align.

These and other objects are achieved by a bolted joint according to the independent claim. Advantageous embodiments are covered by the dependent claims.

According to one aspect of the current invention there is provided a bolted joint of an offshore structure comprising first and second connecting elements, the first connecting element forming part of an offshore tower or an offshore platform and the second connecting element forming part of a foundation structure, the first connecting element comprising a first flange and the second connecting element comprising a second flange, the first and second flanges comprising through holes, the first and second flanges abutting each other with the through holes in alignment and being secured to each other by means of fastening elements extending into the through holes, one of the first and second connecting elements comprising an outer peripheral skirt covering a butt joint between first and second flanges and defining an outer annular space surrounding the butt joint, the annular space being sealed against the ingress of water by a sealing element, wherein one of the first and second connecting elements comprises a peripheral collar, wherein the skirt and the collar confine the annular space and wherein the sealing element is a compressible sealing element sandwiched between the skirt and the collar.

One advantage of providing a compressible sealing element which is sandwiched between the skirt and the collar is that such compressible sealing element provides an absolutely fluid tight sealing against the ingress of water from outside as the seal is compressed tightly between the skirt and the collar. Another advantage is that such a compressible, for example elastomeric sealing element allows for a larger alignment tolerances during installment of the joint. The sealing element might be inserted on the connecting element comprising the peripheral collar and may be resting on the collar before a complementary connecting element with the skirt is being mounted.

Preferably, the sealing element is in the form of an elastomeric sealing ring which may be slipped over one of the first and second connecting elements. The sealing ring/sealing element might comprise an effective lubricant in order to facilitate slipping of the sealing ring over one of the first and second connecting elements.

On the inside of the sealing ring there might be provided an adhesive promoter or a bonding agent in order to prevent vertical slippage of the sealing element after mounting.

In a preferred variant of a bolted joint according to the current invention the sealing element is a sealing ring with an L-shaped cross section comprising a first leg and a second leg, the legs preferably extending in a right angle relative to each other.

In a particularly preferred variant of the current invention the first leg is clamped between the skirt and the collar and the second leg extends into the annular space. Preferably, the first leg is compressed between the edge/rim of the skirt and the collar.

The lateral dimension of the second leg of the sealing ring may be slightly larger than the width of the annular space so that also the second leg of the L-shaped sealing ring is compressed within the annular space.

Preferably, the second leg stretches across the entire width of the annular space in a radial direction.

Even more preferably, the second leg comprises multiple radially extending sealing lips which are in the installed position of the sealing ring sandwiched between the skirt and an outer wall of one of the first and second connecting elements.

Preferably, the sealing lips extend on each side of the second leg, i.e. on the inner side and on the outer side.

The sealing element may be a ring of elastomeric compressible material chosen from one of natural rubber, synthetic rubber, synthetic polyisopren rubber (IR) styrene butadiene rubber (SBR), polybutadiene rubber (BR), nitrile butadiene rubber (NBR), hydrogenated NBR, ethylene propylene rubber (EPDM), EPM, butile rubber (IIR), Neoprene or polychloroprene. The sealing ring may be reinforced using laminations, e.g. with the internal structure comprising a sandwich of steel shims and rubber moulded as one unit.

The second connecting element may be a monopile of a monopile offshore foundation and the first connecting element may be a transition piece of an offshore tower or an offshore platform.

In order to facilitate joining of the connecting elements at least one of the first and second connecting elements may comprise one or several installation guides around an inner perimeter, the installation guides guiding the connecting elements relative to each other upon installation in order align the flanges properly. The installation guides can simply be in the form of inwardly protruding abutments for the inner perimeter of one of the first and second flanges.

As an installation guide there may be provided multiple teeth which are arranged at an inner perimeter of the first connecting element, the teeth extending downwardly at a distance and parallel to wall of the connecting element and protruding beyond the first flange.

Alternatively, as an installation guide there may be provided an apron which is arranged at an inner perimeter of the first connecting element extending downwardly at a distance and concentrically to a wall of the first connecting element and protruding beyond the first flange.

The collar preferably has the shape of a circumferential shelf.

BRIEF DESCRIPTION OF THE DRAWINGS

The invention hereinafter will be described by way of example with reference to the accompanying drawings in which:

FIG. 1 shows a schematic view of an offshore structure according to the invention and FIG. 2 shows an enlarged view of the detail II in FIG. 1.

DETAILED DESCRIPTION OF THE EMBODIMENTS

In FIG. 1 there is shown a rough schematic view of an offshore structure 1 according to the invention. The offshore structure 1 comprises as a foundation element a so-called monopile 2 which is driven into a seabed 3.

The monopile 2 carries a transition piece 4 and on the transition piece there is mounted a tower structure 5 carrying a wind turbine generator 6.

The invention refers to a bolted joint 7 (FIG. 2) of the transition piece 4 and the monopile 2 which are both connecting elements in the sense of the current invention. It is not critical to the invention whether the bolted joint 7 is a joint of a transition piece 4 to a monopile 2 or to another structure. A connecting element rather could be any other connecting profiles/tubes of an offshore structure fixed to each other by nuts and bolts basically in a fluid tight manner. As explained in the very beginning, monopile foundations of offshore structures are rather critical in terms of installation costs and sealing of the joints which are exposed to salt water. Normally, establishing grouted connections require, as mentioned in the very beginning, grouting vessels which is quite expensive.

The invention will hereinafter be explained in more detail with reference to FIG. 2 which shows the enlarged detail II in FIG. 1. FIG. 2 shows a partial section through the monopile 2 and the transition piece 4 flanged to the monopile 2. The monopile 2 as well as the transition piece 4 are designed as hollow steel tubes with inwardly directed first and second flanges 8, 9, the first flange 8 forming part of the transition piece 4 and the second flange 9 forming part of the monopile 2. The first and second flanges comprise through holes 10 extending through the flanges 8, 9.

As this is shown in FIG. 2 in the mounted position the first flange 8 of the transition piece is supported by the second flange 9 of the monopile 2 so that the through holes 10 are in alignment with each other. The through holes 10 are arranged in a bolt circle as this is common. Bolts 11 extend through the aligned through holes are secured by nuts 12. A first sealing ring 13 is sandwiched between the flanges 8, 9. This first sealing ring 13 may extend in a groove in one or two of the abutting faxes of the flanges 8, 9.

The transition piece 4 comprises a transition piece wall 14 at the outside of which a short skirt 15 is attached. The skirt 15 extends completely around the perimeter of the transition piece wall 14 and extends downwardly beyond the first and second flanges 8, 9 so that the skirt 15 completely covers a butt joint 16 between the first and second flanges 8, 9. The skirt 15 and a wall 17 of the monopile define an annular space 18 which receives a second sealing element 19 which is designed as a ribbed compression seal ring. The second sealing ring 19 is L-shaped in cross section and comprises a first leg 20 and a second leg 21. The first leg 20 is shorter than the second leg 21 and in the mounted position as shown in FIG. 2 the first leg 20 is clamped between the leading edge 22 of the skirt 15 and a shelf 23 of the monopile 2. The shelf 23 extends completely around the perimeter of the monopile wall 17 so that the annular space 18 is completely sealed off against the ingress of salt water. The second upwardly extending leg 21 of the second sealing ring 19 includes multiple outer lips 24 and inner lips 25 which provide increasing sealing under water pressure from waves, should the first compressed leg 20 of the second sealing ring 19 fail. The shelf 23 also provides a means for preventing vertical slippage of the second sealing ring 19. The lower and inner edge 29 to the bottom of the second sealing ring 19 is advantageously rounded so that the second sealing ring 19 may be easily slipped over the outer monopile wall 17. Any water passing the second sealing ring 19 may be drained into the inside of the monopile 2 by one or more weep holes 26 extending through the monopile wall 17 above the second leg 21 of the second sealing ring 19.

At the inner side of the transition piece wall 14 there are several installation guides 27 ranged equally spaced apart each other at the inside perimeter of the transition piece 4. The installation guides 27 are designed as tooth-like elements extending downwardly and being attached to gusset plates 28 fixed to the inside transition piece wall 14. The installation guides 27 protrude beyond the first flange 8 of the transition piece 4 downwardly and in parallel to the transition piece wall 14 at a distance from the transition piece wall 14 which is slightly larger than the width of the flanges 8,9.

REFERENCE NUMERALS

1 Offshore structure
2 Monopile
3 Seabed
4 Transition piece
5 Tower structure
6 Wind turbine generator
7 Bolted joint
8 First flange
9 Second flange
10 Through holes
11 Bolt
12 Nut
13 First sealing ring
14 Transition piece wall
15 Skirt
16 Butt joint
17 Monopile wall
18 Annular space
19 Second sealing ring
20 First leg of the second sealing ring
21 Second leg of the second sealing ring
22 Edge of the skirt
23 Shelf
24 Outer lips of the second sealing ring
25 Inner lips of the second sealing ring
26 Weep holes
27 Installation guides
28 gusset plates
29 lower and inner edge

The invention claimed is:

1. A bolted joint of an offshore structure comprising first and second connecting elements, wherein
the first connecting element forms part of an offshore tower or an offshore platform and the second connecting element forms part of a foundation structure;
the first connecting element comprises a first flange and the second connecting element comprises a second flange, wherein the first and second flanges comprise through holes, the first and second flanges abut each other with the through holes in alignment and are secured to each other by means of fastening elements extending into the through hole;
the first connecting element comprises an outer peripheral skirt covering a butt joint between the first and second flanges and defining an outer annular space surrounding the butt joint, and the second connecting element comprising a peripheral collar or
the second connecting element comprising an outer peripheral skirt covering a butt joint between the first and second flanges and defining an outer annular space surrounding the butt joint, and the first connecting element comprising a peripheral collar,
wherein the annular space is sealed against the ingress of water by a sealing element; and
wherein the skirt and the collar confine the annular space and wherein the sealing element is a compressible sealing element sandwiched between the skirt and the collar, and wherein the sealing element is in contact with the skirt and the collar.

2. The bolted joint of claim 1, wherein the sealing element is a sealing ring with an L-shaped cross section comprising a first leg and a second leg.

3. The bolted joint of claim 2, wherein the first leg is clamped between the skirt and the collar and in that the second leg extends into the annular space.

4. The bolted joint of claim 2, wherein the second leg stretches across the entire width of the annular space in a radial direction.

5. The bolted joint of claim 2, wherein the second leg comprises multiple radially extending sealing lips.

6. The bolted joint of claim 1, wherein the sealing element is a ring of elastomeric compressible material chosen from one of natural rubber, synthetic rubber, synthetic polyisopren rubber (IR), styrene butadiene rubber (SBR), polybutadiene rubber (BR), nitrile butadiene rubber (NBR), ethylene propylene rubber (EPDM), EPM, butile rubber (IIR), Neoprene and polychloroprene.

7. The bolted joint of claim 1, wherein the second connecting element is a monopile and the first connecting element is a transition piece of an offshore tower of an offshore platform.

8. The bolted joint of claim 1, wherein at least one of the first and second connecting elements comprises one or several installation guides around an inner perimeter, the installation guides guiding the connecting elements relative to each other upon installation in order to align the flanges properly.

9. The bolted joint of claim 8, wherein multiple teeth forming the installation guides are arranged at an inner perimeter of the first connecting element, the teeth extending downwardly at a distance in parallel to a wall of the first connecting element and protruding beyond the first flange.

10. The bolted joint of claim 8, wherein an apron forming the installation guide is arranged at an inner perimeter of the first connecting element extending downwardly at a distance and concentrically to a wall of the first connecting element and protruding beyond the first flange.

11. The bolted joint of claim 1, wherein the collar has the shape of a circumferential shelf.

* * * * *